(12) United States Patent
Won et al.

(10) Patent No.: US 11,567,938 B1
(45) Date of Patent: Jan. 31, 2023

(54) INTELLIGENT QUERY PLAN CACHE SIZE MANAGEMENT

(71) Applicant: SAP SE, Walldorf (DE)

(72) Inventors: Jaeyeon Won, Cambridge, MA (US); Sung Gun Lee, Seoul (KR); Sanghee Lee, Seoul (KR); Boyeong Jeon, Seoul (KR); Hyung Jo Yoon, Seoul (KR); JunGyoung Seong, Seoul (KR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/381,062

(22) Filed: Jul. 20, 2021

(51) Int. Cl.
*G06F 16/245* (2019.01)
*G06F 16/2455* (2019.01)
*G06F 16/2453* (2019.01)

(52) U.S. Cl.
CPC .. *G06F 16/24552* (2019.01); *G06F 16/24542* (2019.01)

(58) Field of Classification Search
None
See application file for complete search history.

(56) References Cited

U.S. PATENT DOCUMENTS

| | | | | |
|---|---|---|---|---|
| 11,093,496 | B1* | 8/2021 | Bhatia | G06F 16/24552 |
| 2003/0093647 | A1* | 5/2003 | Mogi | G06F 16/24552 |
| | | | | 712/1 |
| 2005/0240570 | A1* | 10/2005 | Ozbutun | G06F 16/24539 |
| 2007/0233638 | A1 | 10/2007 | Carroll et al. | |
| 2009/0106321 | A1* | 4/2009 | Das | G06F 16/24542 |
| 2009/0276394 | A1* | 11/2009 | Bestgen | G06F 16/24542 |
| 2009/0327242 | A1* | 12/2009 | Brown | G06F 16/24549 |
| 2017/0337138 | A1 | 11/2017 | Li et al. | |
| 2021/0073232 | A1* | 3/2021 | Lee | G06F 16/24542 |

OTHER PUBLICATIONS

Klaus Aschenbrenner, "How SQL Service executes a query," https://www.sqlpassion.at/archive/2015/08/17/how-sql-server-executes-a-query/, printed Apr. 9, 2021, 8 pages.
Beckmann et al., "LHD: Improving Cache Hit Rate by Maximizing Hit Density," https//www.usenix.org/conference/nsdi18/presentation/Beckmann, Proceedings of the 15th USENIX Symposium on Networked Systems Design and Implementation, Renton, WA, Apr. 9-11, 2018, 16 pages.
"Cache Replacement Policies," Wikipedia, https://en.wikipedia.org/wiki/Cache_replacement_policies, printed Mar. 23, 2021, 14 pages.
"Execution Plan Cache Analysis," SQL Service Performance and Tuning, https://guides.peruzal.com/sql-server-performance-tuning-and-optimization/execution-plan-cache-analysis/, printed Apr. 8, 2021, 59 pages.

(Continued)

*Primary Examiner* — Son T Hoang
(74) *Attorney, Agent, or Firm* — Klarquist Sparkman, LLP

(57) ABSTRACT

A computer-implemented method can measure query locality during execution of a plurality of incoming queries in a database management system. The database management system includes a query execution plan cache which has a size that can store at least some of query execution plans generated for the plurality of incoming queries. Based on the measured query locality, the method can adjust the size of the query execution plan cache.

19 Claims, 11 Drawing Sheets

(56) References Cited

OTHER PUBLICATIONS

"Execution Plan Eviction," Execution plan Eviction—SQL Baba, https://www.sqlbaba.com/optimization/execution-plan-eviction/, printed Apr. 8, 2021, 7 pages.

Hameed et al., "Dynamic Cache Management in Multi-Core Architectures through Run-time Adaption," Institute of Space Technology, Conference Paper, Mar. 2021, 7 pages.

Ed Pollack, "Searching the SQL Server query plan cache," https://www.sqlshack.com/understanding-sql-server-query-plan-cache/, SQLShack, printed Mar. 23, 2021, 23 pages.

"Query Plan," Wikipedia, https://en.wikipedia.org/wiki/Query_plan, printed Apr. 13, 2021, 3 pages.

Ben Richardson, "Understanding SQL Server query plan cache," https://www.sqlshack.com/searching-the-sql-server-query-plan-cache/, SQLShack, printed Mar. 23, 2021, 9 pages.

"SQL Server Architecture Explained: Named Pipes, Optimizer, Buffer Manager," https://www.guru99.com/sql-server-architecture.html, printed Apr. 9, 2021, 25 pages.

"What are Hit and Miss Ratios? Learn how to calculate them!," https://wp-rocket.me/blog/calculate-hit-and-miss-ratios/, printed Apr. 8, 2021, 17 pages.

Ding et al., "Reuse Distance Analysis," Technical Report UR-CS-TR-741, Computer Science Department, University of Rochester, Feb. 2001.

"Locality of reference," Wikipedia, https://en.wikipedia.org/wiki/Locality_of_reference, printed Apr. 28, 2021, 6 pages.

"Computer Organization | Locality and Cache friendly code," GeeksforGeeks, https://www.geeksforgeeks.org/computer-organization-locality-and-cache-friendly-code/, printed Apr. 28, 2021, 8 pages.

"Locality of Reference and Cache Operation in Cache Memory," GeeksforGeeks, https://www.geeksforgeeks.org/locality-of-reference-and-cache-operation-in-cache-memory/, printed Mar. 23, 2021, 10 pages.

"Communication—extended European Search Report" from the European Patent Office for European Application No. EP22157250.6-1203, dated Aug. 8, 2022, 10 pages.

"Guide to Tuning SQL Plan Cache—SAP HANA," https://wiki.scn.sap.com/wiki/display/SAPHANA/Guide+to+Tuning+SQL+Plan+Cache, Jan. 15, 2021, pp. 1-3.

"SAP HANA Performance Guide for Developers," Document Version: 1.1, Oct. 31, 2019, pp. 1-256.

Storm et al., "Adaptive Self-Tuning Memory in DB2," Very Lage Data Bases, VLDB Endowment, Sep. 12-15, 2006, pp. 1081-1092.

Extended European Search Report from the European Patent Office for counterpart European Application No. EP22176751.0-1203, dated Oct. 18, 2022, 9 pages.

Hiroaki Kobayashi, "Locality Analysis to Control Dynamically Way-Adaptable Caches," ACM SIGARCH Computer Architecture News, vol. 33, No. 3, Jun. 2005 pp. 25-28.

\* cited by examiner

INTELLIGENT QUERY PLAN CACHE SIZE MANAGEMENT

BACKGROUND

A query plan (also referred to as "query execution plan") is a sequence of steps that a database management system (DBMS), such as a structured query language (SQL) server, executes in order to complete a query. When a query is run for the first time in the DBMS, the query can be compiled to generate a corresponding query plan, which can be stored in memory called "query plan cache," which is also referred to as "query execution plan cache," or simply "plan cache," and these terms can be used interchangeably in any of the examples described herein. Thus, when the same query is run again, the DBMS does not need to regenerate the query plan. Instead, it can reuse the cached query plan stored in the query plan cache, thereby improving efficiency of the DBMS.

The size of query plan cache can be important for the performance of the DBMS. If the size of query plan cache is too big, some of query plan cache space may not be used, leading to a waste of valuable cache memory which otherwise could be used for other purposes. On the other hand, if the size of query plan cache is too small, not all generated query plans can be stored in the query plan cache and some of the query plans have to be evicted from the query plan cache according to certain eviction policies. As a result, when there is an incoming query whose corresponding query plan has been evicted from the query plan cache, that query would have to be complied again, thus leading to a delay of query execution.

Accordingly, there remains a need for an improved system and method for managing the size of a query plan cache in a DBMS.

DETAILED DESCRIPTION

Example 1—Overview of Database Management System

Figure 1:
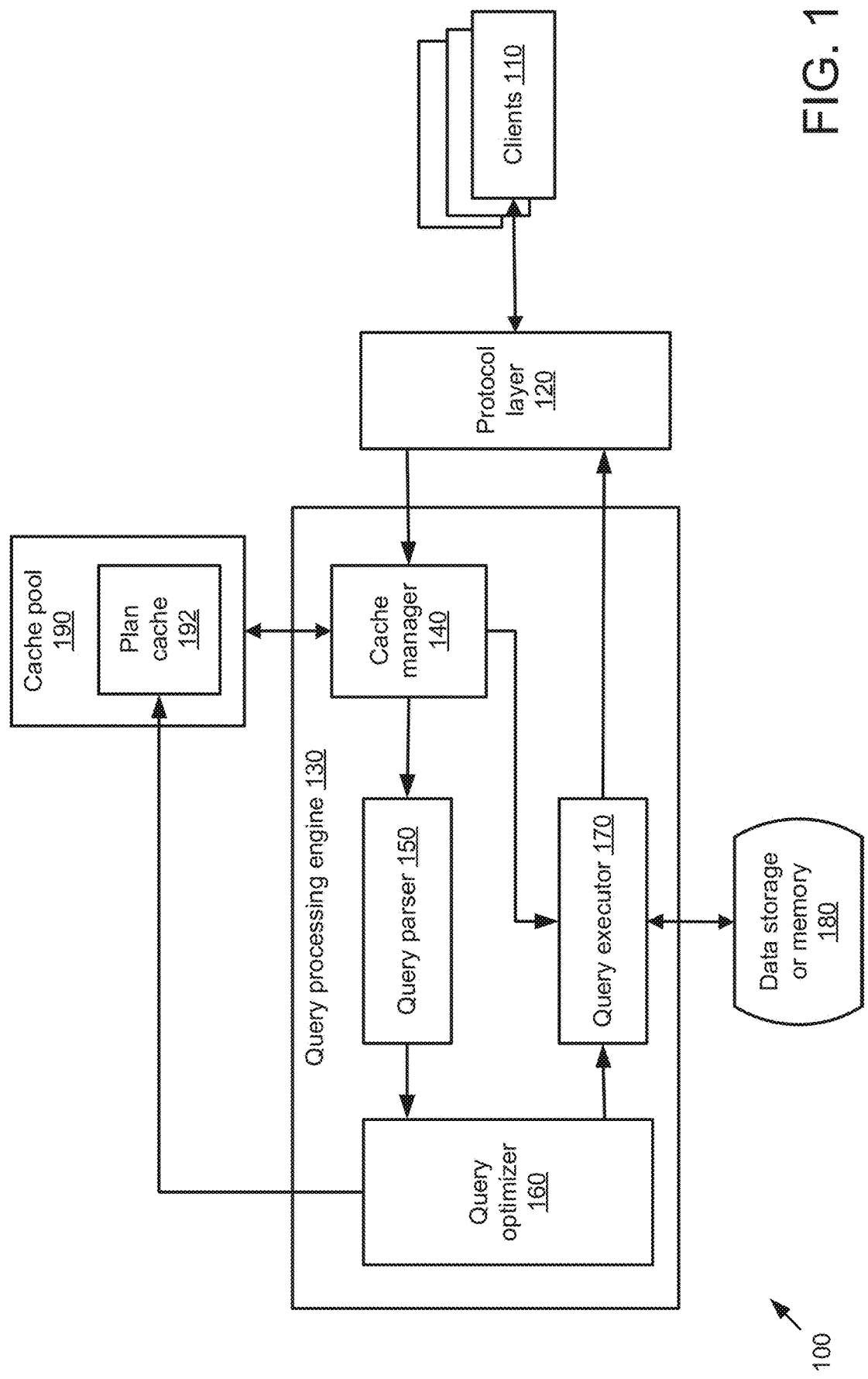
FIG. 1 is an overall block diagram of an example database management system.

FIG. 1 shows an overall block diagram of an example database management system 100 which can implement the intelligent query plan cache size management technology described herein. In an example embodiment, the database management system 100 can be a SQL server.

As shown, the database management system 100 includes a query processing engine 130 and a protocol layer 120 which serves as an interface between one or more clients 110 and the query processing engine 130. For example, the protocol layer 120 can implement a server name indication protocol by which the clients 110 can connect to the query processing engine 130.

The query processing engine 130 can include a cache manager 140, a query parser 150, a query optimizer 160, and a query executor 170. The cache manager 140 can access a cache pool 190, which represents a fast-access memory space. The cache pool 190 can include a plan cache 192 configured to store previously compiled query execution plans, as described below. In certain embodiments, the cache pool 190 can also include a data cache in additional to plan cache 192, wherein the data cache can be configured to keep recent or often-used data in its cache memory which is faster or computationally cheaper to access than normal data storage. The cache pool 190 can be a main memory consumer of the database management system 100 and its size can be configured through Min and Max memory settings.

An incoming query sent from the clients 110 can be evaluated by the cache manager 140 to determine if the query has a corresponding (compiled) query execution plan stored in the plan cache 192.

If the cache manager 140 finds no query execution plan in the plan cache 192 that corresponds to the income query, the incoming query can be analyzed by the query parser 150, which can check if the query contains syntactic and/or semantic errors. After verifying that the incoming query is a valid transactional SQL statement that changes data (e.g., SELECT, INSERT, UPDATE, DELETE, MERGE, etc.), the query parser 150 can generate one or more execution trees in which the query can be run. An execution tree can be used by the query optimizer 160 to generate a corresponding query execution plan, which determines how the query will be executed. The query optimizer 160 can be configured to determine that, among a plurality of query execution plans that are generated based on respective execution trees, which query execution plan is the most optimal or efficient one (e.g., the one that is cheapest in terms of query cost calculated based on CPU usage, memory usage, etc.).

The determined (i.e., most optimal) query execution plan can then be sent to the query executor 170 for execution. The query executor 170 can communicate with a data storage or memory space 180 and execute operators in the query execution plan determined by the query optimizer 170. Data retrieved from the data storage or memory space 180 can be returned to the client 110 via the protocol layer 120.

As described herein, query compilation refers to the process of converting an incoming query to the optimal query execution plan (e.g., checking syntactic and/or semantic errors, generating execution trees, and determining optimal query execution plan), as described above. Depending on the complexity of the query (e.g., the number of joined tables, etc.) and the query optimization algorithm, query compilation time can be long (e.g., tens of seconds or more).

Thus, to improve operational efficiency, the compiled query execution plan (i.e., the determined most optimal query execution plan) corresponding to the incoming query can be stored in the plan cache 192 so that it can be quickly retrieved and reused if the same query is submitted again in the future.

For example, if the cache manager 140 determines that the incoming query has a corresponding query execution plan in the plan cache 192, that query execution plan can be fetched directly from the plan cache 192 and forwarded to the query executor 170 for execution. Thus, in this scenario, operations by the query parser 150 and query optimizer 160 can be bypassed. In other words, the incoming query does not need to be recompiled because its previously compiled query execution plan is available in the plan cache 192.

As noted above, the plan cache 192 can store compiled query execution plans. For an incoming query, the cache manager 140 checks if it has a compiled query execution plan stored in the plan cache 192. If yes, then this cached query execution plan can be reused. This can improve efficiency because it eliminates the time of compiling the query (i.e., regenerating the query execution plan). On the other hand, if the query has no compiled query execution plan stored in the plan cache 192, the query has to be compiled. The compiled query can then be stored in the plan cache 192 so that when the same query occurs gain in the future, fast access to its cached query execution plan is feasible. In other words, the plan cache 192 can improve performance by keeping recent or often-used query execution plans in its cache memory which is faster or computationally cheaper to access than normal memory stores.

If the incoming query is new (i.e., a first-time query that has not been submitted before), this new query has no corresponding query execution plan in the plan cache 192 and it must be compiled for the first time. On the other hand, if the incoming query is old (i.e., the same query has been submitted at least once before), whether or not there is a corresponding compiled query execution plan in the plan cache 192 can depend on the size of the plan cache 192 and a plan eviction policy adopted by the cache manager 140.

The plan cache 192 has a limited size. Thus, it may not be able store all compiled query execution plans. When the plan cache 192 approaches its full capacity, certain query execution plans may have to be evicted (i.e., removed) from the plan cache 192 to make room for new ones according to a predefined plan eviction policy (also referred to as "plan eviction algorithm") implemented by the cache manager 140. The efficiency of the eviction policy can be measured by a metric called hit ratio (or hit frequency), which is calculated by dividing the number of cache hits by the total number of cache hits and misses, and it measures how effective a cache is at fulfilling requests for content. As described herein, a cache hit occurs when a query execution plan is requested from a plan cache and the plan cache is able to fulfill that request, and a cache miss occurs when a query execution plan is requested from a plan cache but the query execution plan is not found in the plan cache.

For example, the cache manager 140 can implement a random plan eviction policy which evicts query execution plans from the plan cache 192 in a random manner. In another example, the cache manager 140 can implement the least recently used (LRU) plan eviction policy which removes the least recently used query execution plans first from the plan cache 192. In yet another example, the least frequently used (LFU) plan eviction policy can be used which first evicts the execution policies that are used least often. A further example can be a score-based plan eviction policy. For example, a score for a query execution plan can be calculated as a product of compilation time and hit frequency divided by the size of the query execution plan (i.e., score=compilation time×hit frequency/plan size). A query execution plan with the lowest score can be evicted first (i.e., query execution plans are less likely to be evicted if they take longer time to compile, used more frequently, or have small size). It is to be understood that the above described plan eviction policies are merely illustrative. Many other plan eviction policies can also be used by the cache manager 140.

Different plan eviction policies have their respective advantages and disadvantages. Regardless of eviction policies, the size of plan cache 192 can be a limiting factor. If the size of plan cache 192 is too big, some of plan cache space may not be used, leading to a waste of valuable cache memory which otherwise could be used for other purposes (e.g., for data cache). On the other hand, if the size of plan cache 192 is too small, some of the query execution plans may have to be frequently evicted from the plan cache 192 according to certain eviction policies. As a result, when there is an incoming query whose corresponding query plan has been evicted from the plan cache 192, that query would have to be complied again, thus leading to a decrease in performance.

Thus, it would be advantageous for an improved cache management system that supports more intelligent plan cache size management, and overall, more efficient query operation in a database management system. Such intelligent plan cache size management technologies can be applied across a wide variety of enterprise software environments.

Example 2—Example Intelligent Cache Manager in a DBMS

Figure 2:
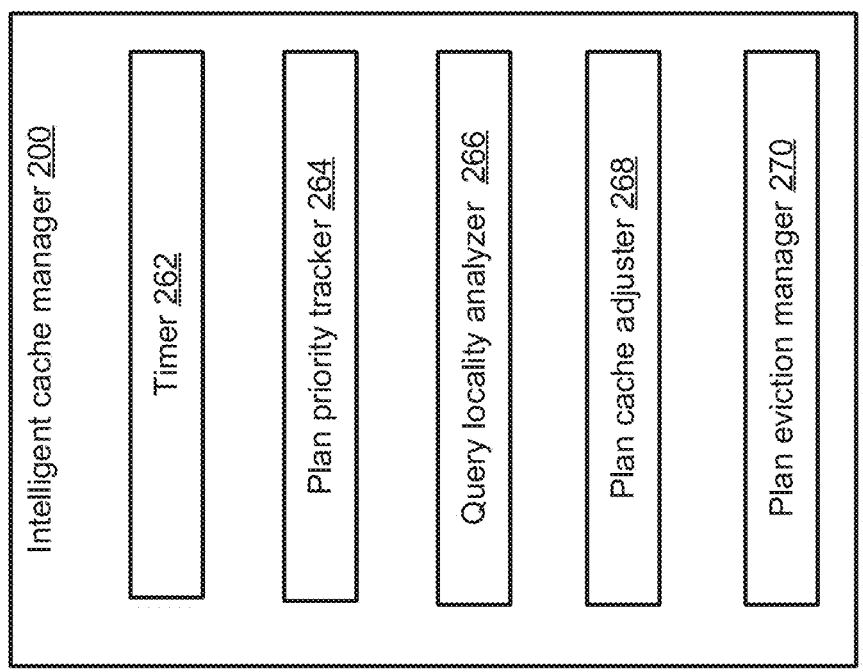
FIG. 2 is a block diagram of an example intelligent cache manager.

FIG. 2 shows a block diagram of an example intelligent cache manager 200 supporting intelligent plan cache size management in a database management system. The intelligent cache manager 200 can be an example embodiment of the cache manager 140 described above.

As shown, the intelligent cache manager 200 can include a timer 262, a plan priority tracker 264, a query locality analyzer 266, a plan cache adjuster 268, and a plan eviction manager 270. The plan eviction manager 270 can be configured to implement a plan eviction policy, which can be any of the plan eviction policies described above, or other known or to be developed plan eviction policies.

As described herein, the timer 262 can measure or track the actual compilation time of incoming queries. The timer 262 can also measure or track the elapsed time since a start time (e.g., the time when the database management system was turned ON).

The plan priority tracker 264 can be configured to track the priority orders of query execution plans stored in the plan cache (e.g., 192). Depending on the plan eviction policy implemented by the plan eviction manager 270, the priority of query execution plans stored in the plan cache can be ordered differently. The physical order of the query execution plans stored in the plan cache can be different from their priority order. Generally, when plan eviction is needed, the plan eviction manager 270 can be configured to evict query execution plans with lower priorities while retaining query execution plans with higher priorities. For example, in the case of a cache miss (i.e., an incoming query has no corresponding query execution plan stored in the plan cache), the query execution plan with the lowest priority can be the candidate for eviction from the plan cache to make room for the insertion of newly generated query execution plan corresponding to the incoming query. The priority orders of the query execution plans in the plan cache can then be readjusted accordingly, based on the plan eviction policy implemented by the plan eviction manager 270.

The query locality analyzer 266 can be configured to measure query locality of the incoming queries in relation to the query execution plans stored in the plan cache. As described herein, query locality (also referred to as "temporal query locality") refers to a measure of tendency of a database management system—when processing the incoming queries—to access the same set of query execution plans in the plan cache repetitively over a short period of time. Higher query locality means that, when processing the incoming queries, the likelihood of assessing the same set of query execution plans from the plan cache is high, thus leading to faster query execution. In contrast, lower query locality means that, when processing the incoming queries, the likelihood of assessing the same set of query execution plans from the plan cache is low, thus leading to slower query execution. As described more fully below, one example method of measuring query locality is based on the measurement of accumulated promotion distances for the incoming queries.

The plan cache adjuster 268 can be configured to dynamically adjust the size of the plan cache (e.g., 192), based on the measured query locality. As described more fully below, in certain embodiments, the size of plan cache can be increased, e.g., when the measured query locality has decreased to a certain extent over a time window. In certain embodiments, the size of plan cache can be decreased, e.g., when the measured query locality has increased to a certain extent over a time window. The increase and/or decrease of the plan cache size can fixed or be adaptive. For example, in certain embodiments, the increase and/or decrease of the plan cache size can be adaptive to the change of the query locality. Increasing the plan cache size can be achieved by allocating an extra cache or memory space to the plan cache (e.g., repurposing a portion of the cache pool 190 outside the plan cache 192 to plan cache 192). Decreasing the plan cache size can be achieved by removing a portion of the plan cache (e.g., releasing a portion of the plan cache 192 to the cache pool 190).

In practice, the systems and subsystems shown herein, such as system 100 and intelligent cache manager 200, can vary in complexity, with additional functionality, more complex components, and the like. For example, there can be additional functionality within the cache manager 140 or 200. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems/subsystems described herein can be implemented in conjunction with any of the hardware components described herein, such as the computing systems described below (e.g., processing units, memory, and the like). In any of the examples herein, the compilation time, the priority order, the measured query locality, the calculated promotion distances, the increase and/or decrease of plan cache size, and the like can be stored in one or more computer-readable storage media or computer-readable storage devices. The technologies described herein can be generic to the specifics of operating systems or hardware and can be applied in any variety of environments to take advantage of the described features.

Figure 3:
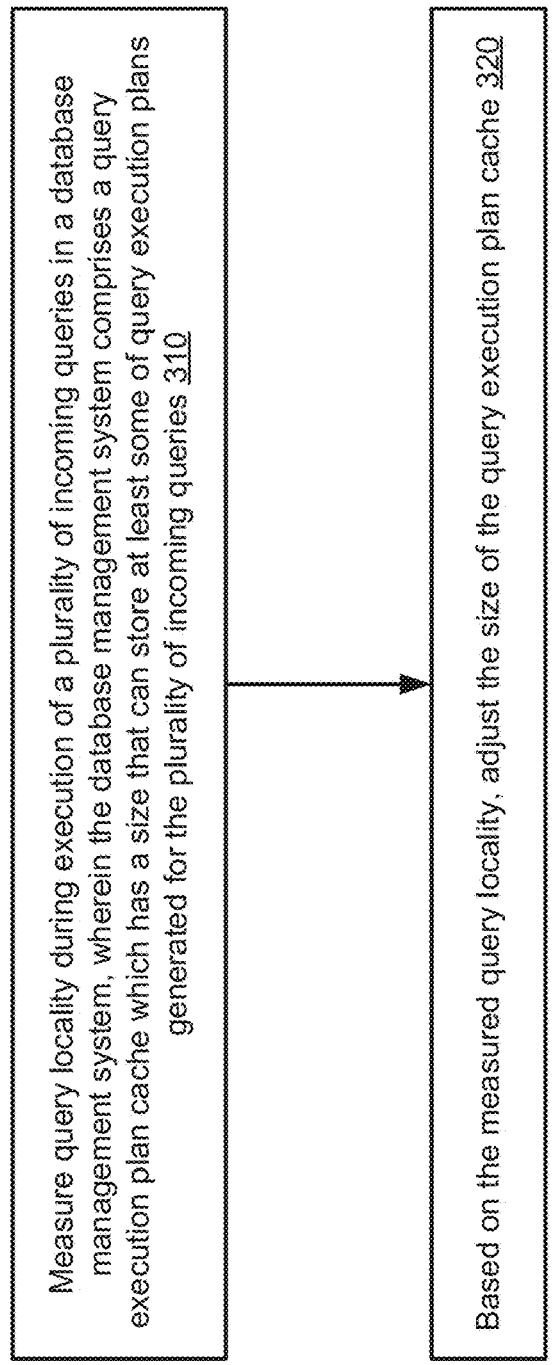
FIG. 3 is a flowchart illustrating an example overall method of intelligent query plan cache size management.

Example 3—Example Overall Method of Intelligent Query Plan Cache Size Management FIG. 3 is a flowchart 300 of an example overall method of implementing intelligent query plan cache size management and can be performed, for example, by the system of FIG. 1, or more specifically, by the cache manager 140 or 200.

At 310, the method can measure query locality during execution of a plurality of incoming queries in a database management system. The database management system can include a query execution plan cache which has a size that can store at least some of query execution plans generated for the plurality of incoming queries. In certain embodiments, measuring the query locality corresponding to the incoming queries can be performed by a query locality analyzer (e.g., 266) in conjunction with a plan priority tracker (e.g., 264) of the cache manager. Example methods for measuring query locality are described in more details below.

At 320, based on the measured query locality, the method can adjust the size of the query execution plan cache. In certain embodiments, the measured query locality can be sent to a plan cache adjuster (e.g., 268), which can dynamically increase and/or decrease the size of the query execution plan cache accordingly, as described more fully below.

The method described in the flowchart 300 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "send" can also be described as "receive" from a different perspective.

Figure 4:
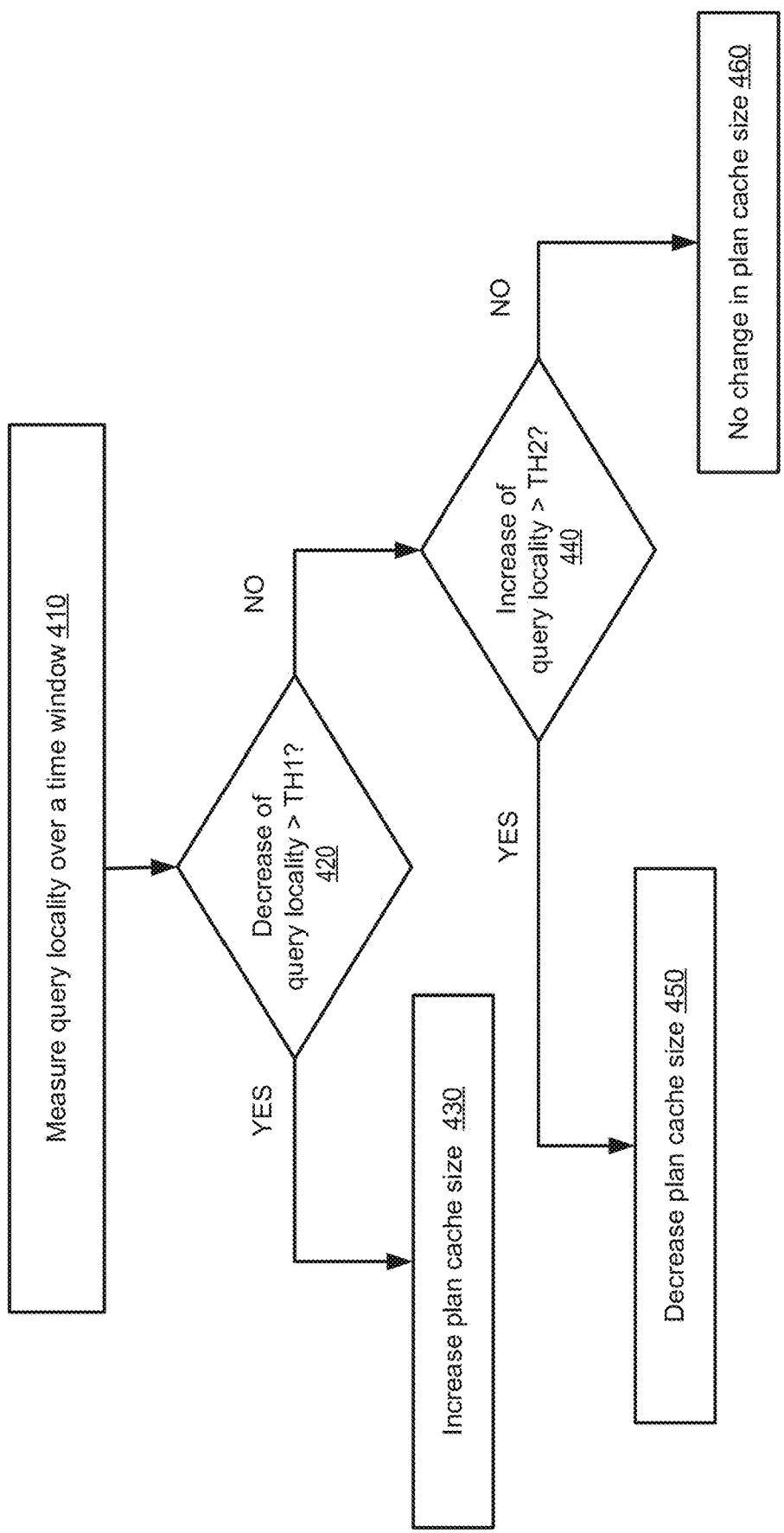
FIG. 4 is a flowchart illustrating a method for dynamically adjusting query plan cache size based on measurement of query locality.

Example 4—Example Method for Dynamically Adjusting Query Plan Cache Size Based on Measured Query Locality FIG. 4 shows a flowchart 400 of an example method for dynamically adjusting the size of a query execution plan cache based on measured query locality. As noted above, the method can be implemented by a plan cache adjuster (e.g., 268), in conjunction with a query locality analyzer (e.g., 266) and a plan priority tracker (e.g., 264) in the cache manager.

As shown, at 410, the method can measure the query locality over a time window. In one embodiment, the time window can have a predefined duration (e.g., one second, ten seconds, one minute, etc.). In another embodiment, the time window can correspond to a time duration when a predetermined number of incoming queries (e.g., 1 query, 10 queries, 100 queries, 1,000 queries, 5,000 queries, 10,000 queries, etc.) are submitted by clients and/or executed.

The measured query locality over the time window can then be evaluated. For example, at 420, a condition check can be performed to determine if the measured query locality over the time window has decreased to such an extent that the decrease of query locality is greater than a first threshold (TH1), which can be a predefined value. If yes, the method can branch to 430 to increase the plan cache size. If no, the method can perform another condition check at 440 to determine if the measured query locality over the time window has increased to such an extent that the increase of query locality is greater than a second threshold (TH2), which can also be a predefined value. If yes, the method can branch to 450 to decrease the plan cache size. Otherwise, the method can branch to 460 where no change in plan cache size occurs.

As described herein, the second threshold (TH2) can be the same as or different from the first threshold (TH1). Thus, the plan cache size will remain unchanged in one of the following three conditions: (1) If the query locality has decreased over the time window but the decrease is smaller than TH1 (i.e., the decrease in query locality is considered negligible), or (2) if the query locality has increased over the time window but the increase is smaller than TH2 (i.e., the increase in query locality is considered negligible), or (3) if the query locality does not change over the time window.

In a special case where TH1=0, any decrease in measured query locality in the time window can lead to an increase of the plan cache size at 430.

In another special case where TH2=0, any increase in measured query locality in the time window can lead to a decrease of the plan cache size at 450.

In yet another special case where TH1=TH2=0, the plan cache size will either increase at 430 due to a decrease of measured query locality or decrease at 450 due to an increase of measured query locality, unless the measured query locality does not change over the time window.

While in the depicted flowchart 400, the condition check 420 is performed before the condition check 440, it is to be understood that in alternative embodiments, the condition check 420 can be performed after the condition check 440.

In certain embodiments, evaluation of the measured query locality (e.g., the condition checks 420 and 440) can be performed in continuous, non-overlapping time windows. For example, the evaluation can be performed after every minute (or other predefined durations), or after every 1,000 queries (or other predefined number of queries). In other embodiments, evaluation of the measured query locality (e.g., the condition checks 420 and 440) can be performed in continuous, overlapping time windows. The degree of overlap between adjacent time windows can be predefined. For example, a first time window may correspond to a time period from 0 to 60 seconds, a second time window may correspond to a time period from 1 to 61 seconds (i.e., with 1 second overlap), and so on. Similarly, a first time window may correspond to a time window which includes queries 1-1000, a second time window may correspond to a time window which includes queries 11-1011 (i.e., with an overlap of 10 queries), etc.

Example 5—Example Query Sequences with High and Low Query Localities

As described above, query locality is a measure of tendency that the same set of query execution plans in the plan cache are repetitively accessed when processing the incoming queries.

Figure 5:
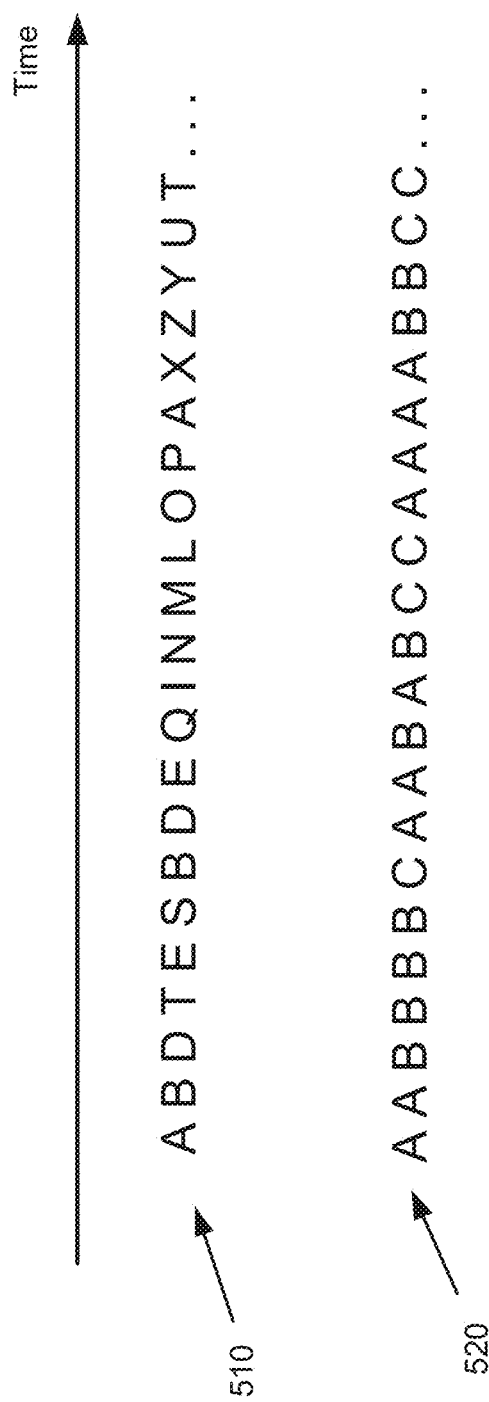
FIG. 5 depicts two example query sequences having high and low query locality, respectively.

For illustration purposes, FIG. 5 shows two example query sequences 510 and 520 submitted for processing over time, wherein each query sequence includes a plurality of incoming queries. As shown, the query sequence 510 comprises a plurality of incoming queries (i.e., "ABDTESBD-EQINMLOPAXZYUT . . . ") that show more distinct queries (i.e., different from others) and a lot of query-to-query variations. Thus, it can be expected that the incoming queries in 510 corresponds to lower query localities, i.e., when processing the incoming queries in 510, the likelihood of reusing the same set of query execution plans from the plan cache is low. In contrast, the query sequence 520 comprises a plurality of incoming queries (i.e., "AABBBB-CAABABCCAAAABBCC . . . ") that show only three distinct queries (i.e., A, B, and C) and more query-to-query repetitions. Thus, it can be expected that the incoming queries in 520 corresponds to higher query localities, i.e., when processing the incoming queries in 520, the likelihood of reusing the same set of query execution plans from the plan cache is high.

Example 6—Example Methods for Measuring Query Locality Based on Accumulated Promotion Distances There can be different ways of measuring query locality. One example method of measuring query locality is described below, with reference to FIGS. 6-7.

Figure 6:
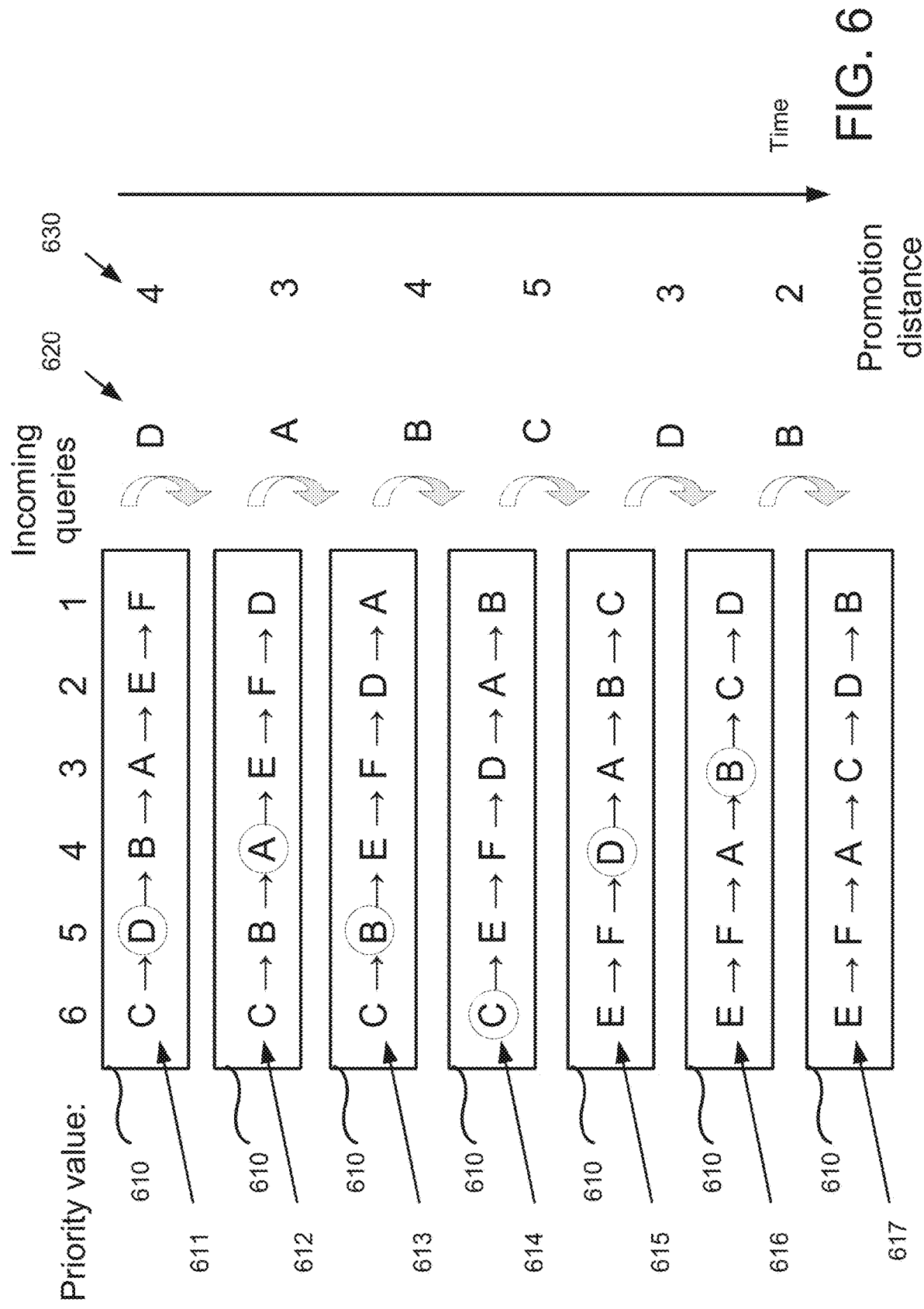
FIG. 6 depicts priority ordered query plans stored in a plan cache when the incoming queries have a relatively low query locality.
Figure 7:
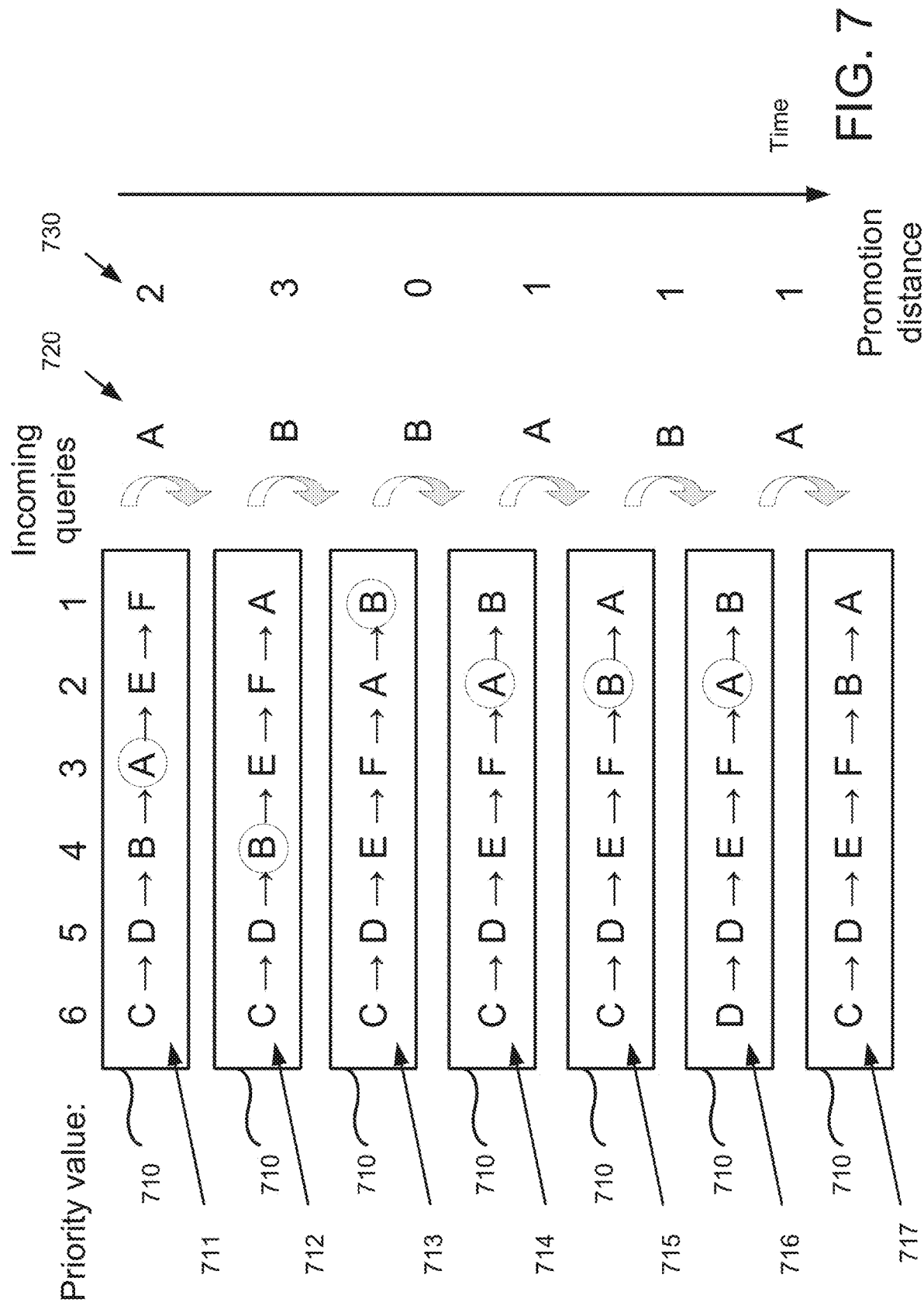
FIG. 7 depicts priority ordered query plans stored in a plan cache when the incoming queries have a relatively high query locality.

FIG. 6 depicts priority ordered query execution plans 611-617 stored in a plan cache 610 when the incoming queries 620 have a relatively low query locality (compared to the example depicted in FIG. 7). In this example, the plan cache 610 can store six query execution plans. Initially, the plan cache 610 includes the query execution plans for the following queries: A, B, C, D, E, and F, respectively. These query execution plans can be ordered based on their priority. In the depicted example, a smaller priority value indicates a higher priority and a larger priority value indicates a lower priority. As shown, the initial priority order list 611 of the query execution plans stored in the plan cache 610 can be represented as: C→D→B→A→E→F, i.e., the query execution plan for query C has the lowest priority (with priority value 6) and the query execution plan for query F has the highest priority (with priority value 1). As noted above, such priority orders can be tracked by a plan priority tracker (e.g., 264), and the physical order of the query execution plans stored in the plan cache 610 can be different from their priority order.

For illustrative purposes, in the examples described below, it is assumed that an LRU plan eviction policy is implemented for the plan cache 610, which removes the least recently used query execution plan from the plan cache 610 upon a cache miss. In an LRU based plan cache, a promotion method can be implemented such that a cache hit can cause the corresponding query execution plan to move to the highest priority order. In other words, after receiving a cache hit, the found query execution plan can be promoted to the highest priority order (i.e., priority value=1) in the plan cache 610.

As depicted in FIG. 6, the incoming queries 620 includes the following query sequence: "DABCDB." The first query D causes a cache hit, as indicated by the circled D in the plan cache 610. As a result, the query execution plan corresponding to query D is promoted to the highest priority order, and the query execution plans in the plan cache 610 is updated to a new priority order list 612: C→B→A→E→F→D. Next, the second query A causes a cache hit (as indicated by the circled A in the plan cache), and its corresponding query execution plan is promoted to the highest priority order, resulting in an updated priority order list 613: C→B→E→F→D→A. Following the similar steps, when the last query B causes a cache hit, the final priority order list 617 becomes E→F→A→C→D→B.

According to certain embodiments, query locality can be measured by accumulating promotion distances 630 for the plurality of incoming queries 620. As described herein, when an incoming query causes a cache hit, a promotion distance for the incoming query can be calculated as an absolute difference between the new and old priority orders of the query execution plan corresponding to the incoming query. For example, when the first query D causes the cache hit, the priority order of the corresponding query execution plan changes from 5 to 1. Thus, the promotion distance for the first query D is 4. Likewise, when the second query A causes the cache hit, the priority order of the corresponding query execution plan changes from 4 to 1. Thus, the promotion distance for the second query A is 3. Following the similar steps, the promotion distances for the six incoming queries "DABCDB" are calculated to be 4, 3, 4, 5, 3, and 2, respectively. The accumulated promotion distance for the incoming query sequence "DABCDB" is thus 4+3+4+5+3+2=21.

On the other hand, when an incoming query causes a cache miss (i.e., the incoming query has no generated query execution plan stored in the query execution plan cache), a promotion distance for the incoming query can be set to a count of query execution plans stored in the plan cache. For example, if an incoming query is Z which causes a cache miss because it has no corresponding query execution plan stored in the plan cache 610, the promotion distance for the incoming query Z can be set to 6, which is the total number of query execution plans stored in the plan cache 610.

For comparison purposes, FIG. 7 depicts priority ordered query plans 711-717 stored in a plan cache 710 when the incoming queries 720 have a relatively high query locality (compared to the example depicted in FIG. 6). As shown, the plan cache 710 also stores six query execution plans respectively for queries A, B, C, D, E, and F, and their initial priority order list 711 is identical to 611, i.e., C→D→B→A→E→F. However, the incoming queries 720 "ABBABA" has more repetitive queries and less variation than 620. Similarly, each of the incoming query results in a cache hit. Following the same promotion method described above, the priority order list 711 can be progressively updated to 712, 713, and so on, until 717. The calculated promotion distances for the incoming queries "ABBABA" are 2, 3, 0, 1, 1, and 1, respectively. The accumulated promotion distance for the incoming query sequence "ABBABA" is thus 2+3+0+1+1+1=8.

Comparing the examples shown in FIGS. 6-7, it can be appreciated that an increase of accumulated promotion distances indicates a decrease in query locality and a decrease of accumulated promotion distances indicates an increase in query locality. A large promotion distance occurs when a query execution plan with a low priority is promoted (in case of a cache hit) or no corresponding query execution plan exists in the plan cache (i.e., in case of a cache miss). Thus, it indicates the likelihood of reusing the same set of query execution plans from the plan cache is low. In contrast, a small promotion distance suggests the promoted query execution plan already has a high priority before such promotion (in case of a cache hit). Thus, it indicates the likelihood of reusing the same set of query execution plans from the plan cache is high. Hence, the larger the accumulated promotion distance, the lower the query locality, and vice versa.

In certain embodiments, the query locality can be simply defined as the reciprocal of the accumulated promotion distance. For example, the measured query locality is $1/21$ for the incoming queries depicted in FIG. 6 and $1/8$ for the incoming queries depicted in FIG. 7. In other embodiments, query locality can be defined as the negative of the accumulated promotion distance. For example, the measured query locality is −21 for the incoming queries depicted in FIG. 6 and −8 for the incoming queries depicted in FIG. 7. Other definitions are also possible so long as the query locality is inversely proportional (either linearly or nonlinearly) to the accumulated promotion distance.

Example 7—Example Alternative Methods for Measuring Query Locality

Although a particular promotion method is used in the examples shown in FIGS. 6-7, it is to be understood that, in other embodiments, the corresponding query execution plan after a cache hit may not move to the highest priority order. For example, upon a cache hit, the found query execution plan may be promoted to the second (or third, fourth, etc.) highest priority order in the plan cache. Or alternatively, the found query execution plan may be promoted to a priority order that is higher than the previous priority order by a predefined level (e.g., 1, 2, 3, or more levels higher). More generally, the implemented plan eviction policy does not need to be LRU. The methods described herein can be applied to any plan eviction policy so long as a cache hit can promote the corresponding query execution plan to a higher priority order, unless the corresponding query execution plan already has the highest priority order (in which case its priority order will remain unchanged).

Although in the examples described above, measurement of query locality is based on a particular method of accumulating promotion distances for the incoming queries, it is to be understood that query locality can be measured by other methods.

For example, the promotion distance for an incoming query that causes a cache miss can be defined in different ways. More generally, when an incoming query causes a cache miss, the promotion distance for the incoming query can be set to a value that is greater than or equal to the count of query execution plans stored in the plan cache. For example, if the incoming query causes a cache miss, the promotion distance for the incoming query can be set to CNT+Δ, where CNT is the count of query execution plans stored in the plan cache, and Δ can be a predefined non-negative value (e.g., Δ=0, 1, 2, 3, or more). In another example, if the incoming query causes a cache miss, the promotion distance for the incoming query can be set to μ×CNT, where μ can be a predefined coefficient that is no less than 1 (e.g., μ=1, 1.5, 2, etc.). Setting a larger promotion distance for an incoming query that causes a cache miss can further increase the accumulated promotion distance, thus indicating lower query locality as the frequency of cache miss increases. Thus, the parameters Δ and/or μ can be predefined to adjust the "degree of penalty" (in terms of the measured promotion distance) when cache miss occurs.

In another example, in certain embodiments, the query locality can be measured based on the calculation of reuse distances (instead of promotion distances) for the incoming queries, where the reuse distance for a query X can be defined as the number of distinct queries between processing this query X and a prior processing of the same query X.

In yet another example, in certain embodiments, the query locality in a time window can be simply measured by the hit ratio, which can be calculated by dividing the number of cache hits by the total number of incoming queries in the time window. Higher hit ratio (or conversely, lower miss ratio) can indicate higher query locality, and vice versa. In such circumstances, the query locality simply measures the frequency of reusing query execution plans in the plan cache when processing the incoming queries, regardless of the priority orders of the query execution plans.

In yet a further example, in certain embodiments, the query locality in a time window can be simply measured based on counting the unique number of queries occurred in the time window. The more unique number of queries in the time window indicates more query variations, thus the lower query locality, and vice versa. Similarly, the priority order of the query execution plans needs not to be considered if the query locality is measured based on the unique number of queries occurred in a time window. Other statistical metrics that measure query variation in a time window can similarly be used to quantify the query locality, where lower query variation in the time window indicates higher query locality.

Example 8—Example Methods for Determining Amount of Increment or Decrement of Query Plan Cache Size In any of the examples herein, plan cache size can be increased by allocating an extra cache or memory space to the plan cache (e.g., allocating an extra cache space in the cache pool 190 to the plan cache 192), or decreased by removing a portion of the plan cache (e.g., releasing a portion of the plan cache 192 to the cache pool 190).

In any of the examples herein, the increase and/or decrease of the plan cache size can be constrained within predefined maximum and/or minimum plan cache size limits. In certain embodiments, the maximum and/or minimum plan cache size limits can be fixed values. In certain embodiments, the maximum and/or minimum plan cache size limits can be configured to be adaptive to the size of a cache pool (e.g., 190). For example, the increase of the plan cache size can be limited by a maximum cache size that has a fixed value (e.g., 1 GB, 2 GB, 10 GB, etc.), or a predefined percentage (e.g., 50%, 60%, 75%, etc.) of the size of the cache pool. Similarly, the decrease of the plan cache size can be limited by a minimum cache size that has a fixed value (e.g., 10 MB, 100 MB, 200 MB, etc.), or a predefined percentage (e.g., 10%, 20%, 25%, etc.) of the size of the cache pool.

In any of the examples herein, the amount of increase or decrease of the plan cache size can be fixed. For example, to increase the plan cache size, an extra cache of a predefined size (e.g., 1 MB, 10 MB, 25 MB, etc.) can be added to the plan cache. Likewise, to decrease the plan cache size, a cache portion having a predefined size (e.g., 1 MB, 10 MB, 25 MB, etc.) can be removed from the plan cache.

In any of the examples herein, the amount of increase or decrease of the plan cache size can be adaptive or proportional to the current plan cache size (i.e., the size the plan cache before such increase or decrease). For example, to increase the plan cache size, an extra cache whose size is a predefined percentage (e.g., 0.5%, 1%, 2%, etc.) of the current plan cache size can be added to the plan cache. Likewise, to decrease the plan cache size, a cache portion whose size is a predefined percentage (e.g., 0.5%, 1%, 2%, etc.) of the current plan cache size can be removed from the plan cache.

In any of the examples herein, the amount of increase or decrease of the plan cache size can be adaptive or proportional to a size of a query execution plan stored in the plan cache (also referred to as a "reference query plan"). For example, to increase the plan cache size, an extra cache can be added to the plan cache, wherein the size of the extra cache can be proportional to (e.g., 50%, 100%, 200%, etc.) the size of the reference query plan. Likewise, to decrease the plan cache size, a cache portion can be removed from the plan cache, wherein the size of the cache portion can be proportional to (e.g., 50%, 100%, 150%, etc.) the size of the reference query plan. In certain embodiments, the query execution plan which has been last stored in the plan cache can be selected as the reference execution plan. In other embodiments, the reference query plan can be selected based on other criteria. For example, the reference query plan can be selected to be the oldest query execution plan, the largest query execution plan, the query execution plan associated with the most compilation time, the query execution plan associated with the lowest priority order, or the query execution plan associated with the highest (or lowest) hit ratio, and so on.

In any of the examples herein, the amount of increase or decrease of the plan cache size can be adaptive or proportional to a change of measured query locality. For example, to increase the plan cache size, an extra cache can be added to the plan cache, wherein the size of the extra cache can be proportional to the decrease of measured query locality (e.g., a larger increase of accumulated promotional distance can lead to a larger increase of the plan cache). Likewise, to decrease the plan cache size, a cache portion can be removed from the plan cache, wherein the size of the cache portion can be proportional to the increase of measured query locality (e.g., a larger decrease of accumulated promotional distance can lead to a larger decrease of the plan cache).

In any of the examples herein, a trend of the measured query locality over time can be measured. In certain embodiments, the trend can be measured by slopes of the measured query locality over time. The amount of increase or decrease of the plan cache size can be adaptive or proportional to the trend (or slope) of the measured query locality. For example, an increasing trend (e.g., progressively increasing positive slope) of the measured query locality can lead to a larger decrease of the plan cache, whereas a decreasing trend (e.g., progressively decreasing negative slope) of the measured query locality can lead to a larger increase of the plan cache.

Figure 8:
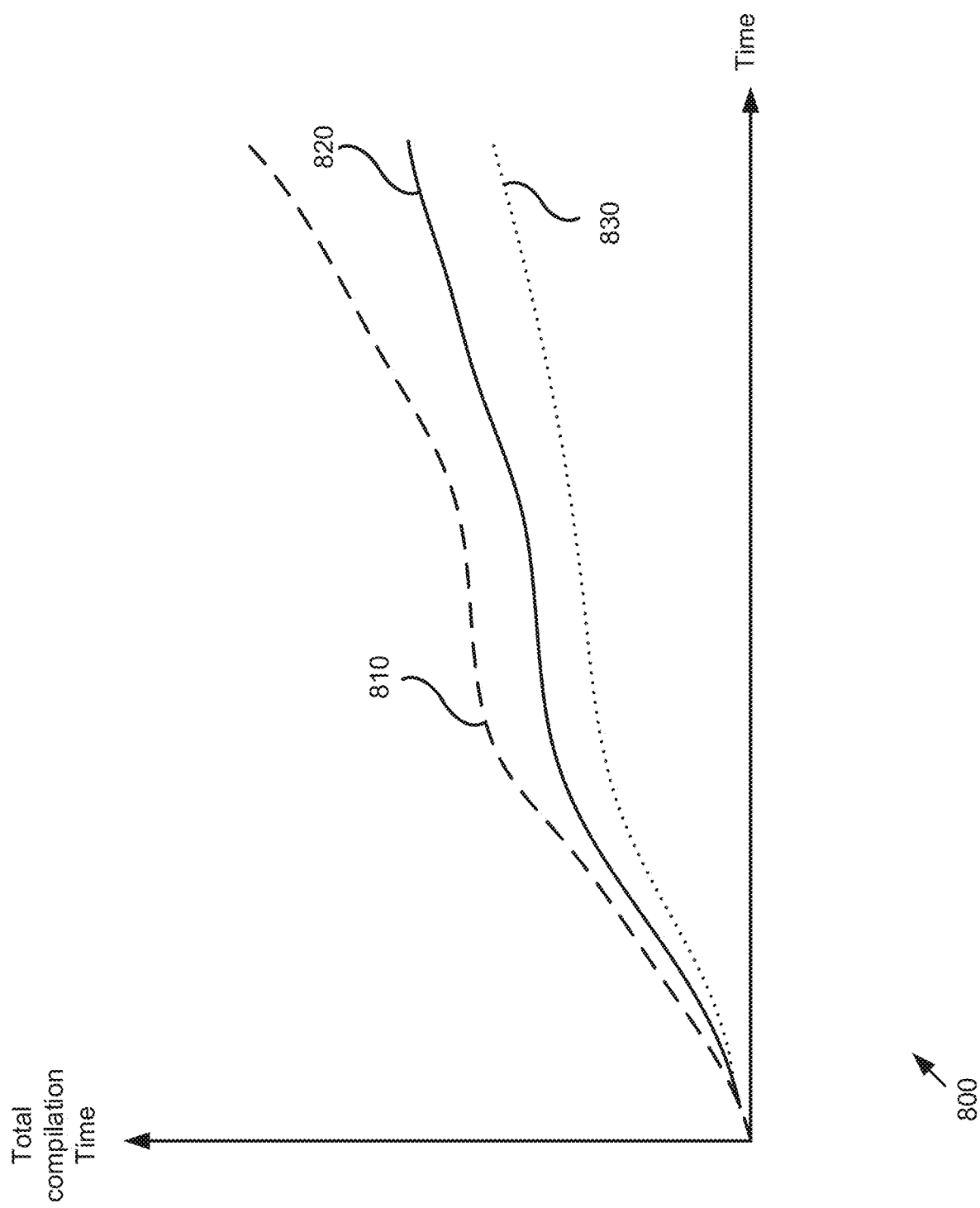
FIG. 8 is an example plot of total compilation time for incoming queries according to three different methods.
Figure 9:
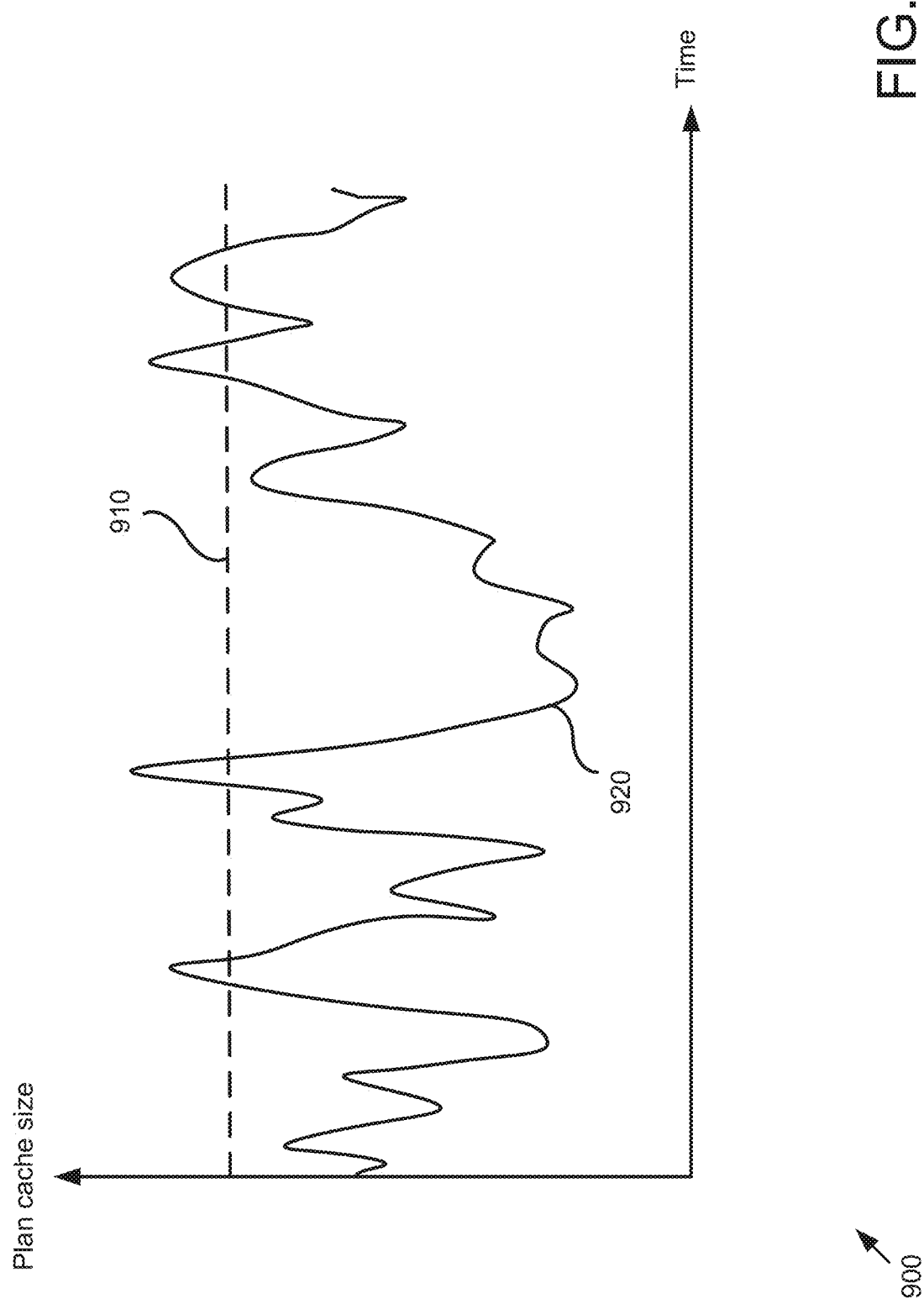
FIG. 9 is an example plot of query plan cache size corresponding to the incoming queries depicted in FIG. 8.

Example 9—Example Uses Cases Illustrating Dynamic Adjustment of Query Plan Cache Size Example use cases are described below, in reference to FIGS. 8-9, to further illustrate the method of intelligent query plan cache size management described above. It is to be understood that FIGS. 8-9 are merely for illustrative purposes and are not necessarily drawn to scale. For example, the shape of certain curves described below can vary from what are depicted in the figures.

FIG. 8 schematically shows an example plot 800, depicting total compilation time accumulated for some incoming queries according to three different cache plan management methods, as described below. The displayed x-axis is the run time when incoming queries are submitted. Alternatively, the x-axis can refer to the number of incoming queries. The y-axis is the total compilation time (i.e., accumulated compilation time) of incoming queries.

In FIG. 8, the curve 810 (shown in a dashed line) shows the total compilation time accumulated for the incoming queries when a specific query eviction policy (e.g., LRU) is implemented while the plan cache has a fixed predetermined size (also referred to as the "fixed plan cache"). The curve 820 (shown in a solid line) shows the total compilation time accumulated for the incoming queries when the same query eviction policy is implemented while the size of the plan cache can be dynamically adjusted using the method described above (also referred to as the "dynamic plan cache"). For example, the plan cache size can be increased when the measured query locality decrease and decreased when the measured query locality increase. The curve 830 (shown in a dotted line) shows the total compilation time accumulated for the incoming queries in an ideal situation where the plan cache is assumed to have an unlimited size such that no query execution plan is evicted from the plan cache (also referred to as the "ideal plan cache").

The total compilation time depicted in the fixed plan cache 810 and dynamic plan cache 820 will depend on the implemented plan eviction policy. For example, the total compilation time in 810 or 820 will increase if there is a cache miss, which can occur in the case of new query which has to be compiled for the first time, or if an old query has no corresponding query execution plan stored in the plan cache (i.e., the previously compiled query execution plan was evicted from the plan cache according to the implemented plan eviction policy). On other hand, the total compilation time in 810 or 820 will remain flat if there is a cache hit, that is, when an old query has a corresponding query execution plan stored in the plan cache so that the query does not need to be recompiled.

On the other hand, the total compilation time depicted for the ideal plan cache 830 can be estimated by assuming that no query execution plan is evicted from the query execution plan cache. Estimation of total compilation times for the ideal situation can be implemented by measuring time saved from not compiling old queries. For example, if an incoming query is new, this new query must be compiled for the first time, even if the size of the query execution plan cache is unlimited. Thus, the ideal compilation time will increase by the amount of time to compile this new query. But if the incoming query is old, its previously compiled query execution plan must exist in the query execution plan cache because, in the ideal situation, it has an unlimited size and never evicts any query execution plan. As a result, this old query does not need to be recompiled, and the ideal compilation time will remain unchanged. In other words, the time to recompile the old query is saved in the ideal situation. Thus, the ideal compilation time establishes a floor or minimum compilation time that is possible to compile the incoming queries. Any measured actual compilation time (e.g., 810 and 820) will be either the same as the ideal compilation time (when no eviction of query execution plan occurs) or larger than the ideal compilation time (when eviction of query execution plan occurs).

In the depicted example, the curves 810, 820, and 830 have certain overlap at the very beginning when most incoming queries are new (thus, they must be compiled for the first time). Then the three curves 810, 820, and 830 start to diverge. Specifically, while the total compilation time of all three curves 810, 820, and 830 progressively increase over time, the curve 830 always remains at the lowest (i.e., establishing the floor, as described above), while the curve 820 is positioned between 810 and 830. In other words, the total compilation time for the fixed plan cache 810 increases at a faster pace than the total compilation time for the dynamic plan cache 820. Thus, by dynamically adjusting the plan cache size, the total compilation time can be reduced even though both methods implement the same plan eviction policy.

To illustrate, FIG. 9 shows a plot 900 including two curves depicting the size of plan cache over time. Specifically, the dashed curve 910 represents the constant plan cache size corresponding to the fixed plan cache curve 810, that is, when a specific query eviction policy is implemented while the plan cache size is fixed. The solid curve 920 shows the variation of plan cache size corresponding to the dynamic plan cache curve 820, that is, when the same query eviction policy is implemented while the size of the plan cache can be dynamically adjusted based on the measured query locality.

As shown in FIG. 9, occasionally the curve 920 can increase above the curve 910, indicating that the plan cache of 920 may need to be increased to a larger size than the fixed plan cache of 910. This can occur when the certain incoming queries have very low query locality. Thus, increasing the size of the plan cache (even above the fixed plan cache of 910) in this situation can accommodate or store more query execution plans so that the likelihood of cache hit for the following queries can increase. This is evidenced by the immediate drop of the plan cache size (which can be far below the fixed plan cache of 910). The average plan cache size over time for the curve 920 can be lower than 910, indicating that overall the plan cache size that is needed to store the query execution plans can be reduced, while simultaneously reducing total compilation time (as shown in FIG. 8).

In other words, when the size of the plan cache is sufficiently large to hold the query execution plans of most incoming queries, the measured query locality may increase, leading to a reduction of the plan cache size (e.g., to release cache resource to the cache pool) without negatively affecting the performance of query execution because few query execution plans are evicted from the plan cache. But when the plan cache is significantly reduced such that some incoming queries have to be recompiled because their previously compiled query execution plans were evicted from the plan cache, the measured query locality may decrease, leading to an increase of the plan cache size so as to reduce or mitigate the negative effect of plan eviction policy.

Example 10—Example Advantages

A number of advantages can be achieved via the technology described herein. For example, the intelligent cache manager can dynamically adjust the cache plan size based on actual need of the plan cache, i.e., increasing or reducing the plan cache size as the need of plan cache increases or decreases, respectively. This is important because the need of plan cache may be unpredictable in the run time and can vary significantly depending on what queries are submitted by clients. As a result, the disclosed technology can continuously find the appropriate (or optimize) the plan cache size in order to maximize the performance of the database management system. The appropriate (or optimized) plan cache size can struck a right balance between query performance and resource management: on one hand, it is not too small to cause frequent evictions of query plans and recompilation of old queries; on the other hand, it is not too big to waste valuable cache memory resources. The intelligent plan cache management technology described herein can be easily deployed to any database management system implementing any query plan eviction policy. In addition, the disclosed method of dynamic adjustment of cache plan size can be performed automatically by the intelligent cache manager without human interaction. Further, such dynamic adjustment of cache plan size can be achieved on the fly or in real-time (e.g., adjustment of the cache plan size can be realized within a fraction of a second after evaluating the query locality in a time window).

Example 11—Example Computing Systems

Figure 10:
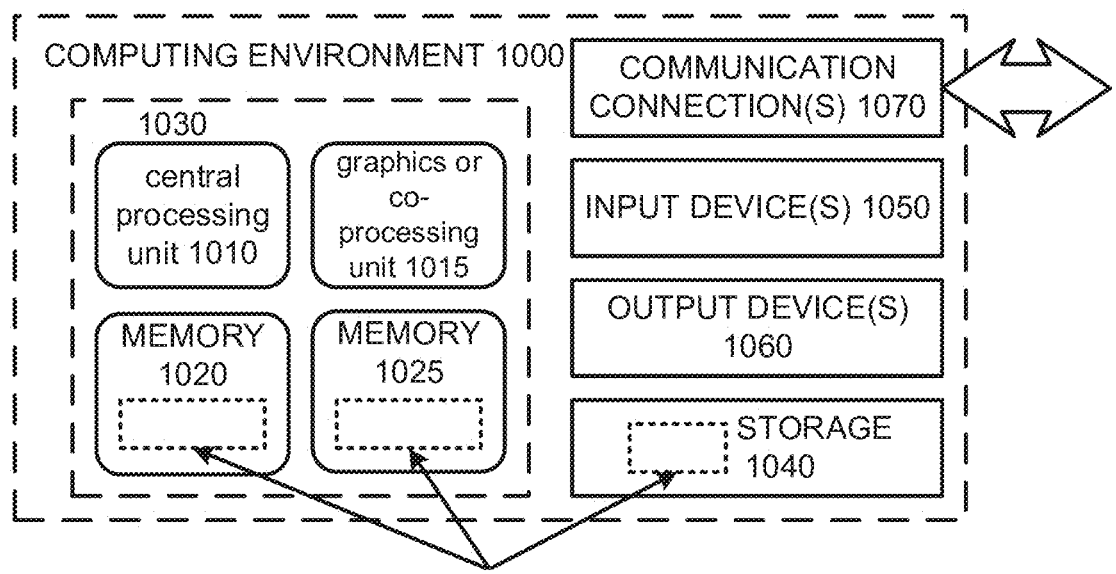
FIG. 10 is a block diagram of an example computing system in which described embodiments can be implemented.

FIG. 10 depicts an example of a suitable computing system 1000 in which the described innovations can be implemented. The computing system 1000 is not intended to suggest any limitation as to scope of use or functionality of the present disclosure, as the innovations can be implemented in diverse computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 can be volatile memory (e.g., registers, cache, RAM), non-volatile memory (e.g., ROM, EEPROM, flash memory, etc.), or some combination of the two, accessible by the processing unit(s) 1010, 1015. The memory 1020, 1025 stores software 1080 implementing one or more innovations described herein, in the form of computer-executable instructions suitable for execution by the processing unit(s) 1010, 1015.

A computing system 1000 can have additional features. For example, the computing system 1000 includes storage 1040, one or more input devices 1050, one or more output devices 1060, and one or more communication connections 1070, including input devices, output devices, and communication connections for interacting with a user. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 can be removable or non-removable, and includes magnetic disks, magnetic tapes or cassettes, CD-ROMs, DVDs, or any other medium which can be used to store information in a non-transitory way and which can be accessed within the computing system 1000. The storage 1040 stores instructions for the software implementing one or more innovations described herein.

The input device(s) 1050 can be an input device such as a keyboard, mouse, pen, or trackball, a voice input device, a scanning device, touch device (e.g., touchpad, display, or the like) or another device that provides input to the computing system 1000. The output device(s) 1060 can be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 12—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 13—Example Cloud Computing Environment

Figure 11:
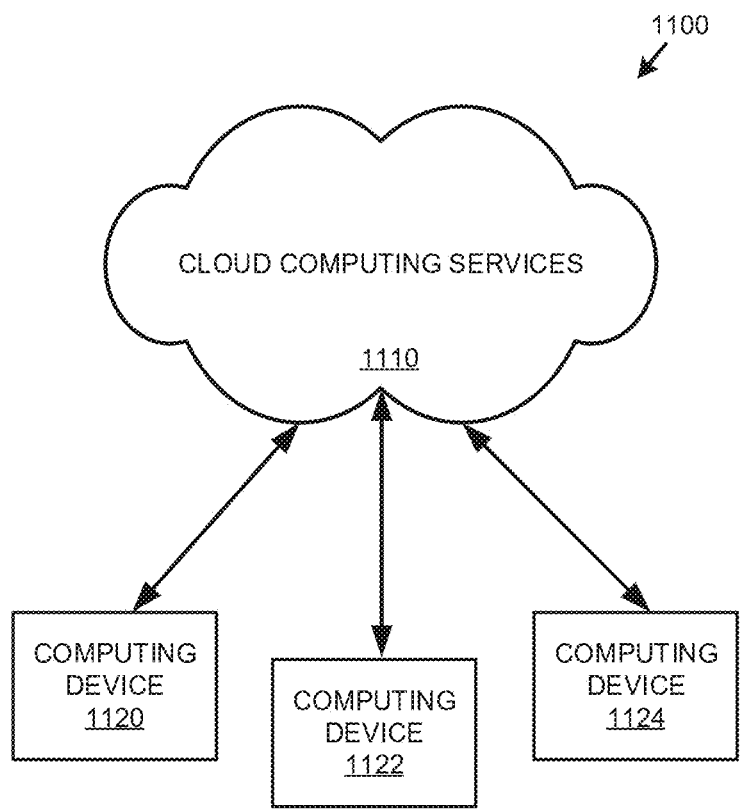
FIG. 11 is a block diagram of an example cloud computing environment that can be used in conjunction with the technologies described herein.

FIG. 11 depicts an example cloud computing environment 1100 in which the described technologies can be implemented, including, e.g., the system disclosed above and other systems herein. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1123. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operations (e.g., data processing, data storage, and the like).

In practice, cloud-based, on-premises-based, or hybrid scenarios can be supported.

Example 14—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

Example 15—Example Embodiments

Any of the following embodiments can be implemented.

Clause 1. A computer-implemented method comprising: measuring query locality during execution of a plurality of incoming queries in a database management system, wherein the database management system comprises a query execution plan cache which has a size that can store at least some of query execution plans generated for the plurality of incoming queries; and based on the measured query locality, adjusting the size of the query execution plan cache.

Clause 2. The method of clause 1, wherein measuring query locality comprises accumulating promotion distances for the plurality of incoming queries.

Clause 3. The method of clause 2, wherein if an incoming query has a generated query execution plan stored in the query execution plan cache, a promotion distance for the incoming query is determined based on a priority order of the generated query execution plan in the query execution plan cache.

Clause 4. The method of any one of clauses 2-3, wherein if an incoming query has no generated query execution plan stored in the query execution plan cache, a promotion distance for the incoming query is set to a count of query execution plans stored in the query execution plan cache.

Clause 5. The method of any one of clauses 1-4, wherein adjusting the size of the query execution plan cache comprises increasing the size of the query execution plan cache if the measured query locality has decreased over a time window.

Clause 6. The method of clause 5, wherein increasing the size of the query execution plan cache comprises allocating an extra cache to the query execution plan cache, wherein a size of the extra cache is a predefined fraction of a difference between a predefined maximum cache size and the size of the query execution plan cache before allocating the extra cache.

Clause 7. The method of any one of clauses 5-6, wherein the time window has a predefined duration or has a duration when a predetermined number of incoming queries are submitted for execution.

Clause 8. The method of any one of clauses 1-7, wherein adjusting the size of the query execution plan cache comprises decreasing the size of the query execution plan cache if the measured query locality has increased over a time window.

Clause 9. The method of clause 8, wherein decreasing the size of the query execution plan cache comprises removing a cache portion out of the query execution plan cache, wherein the cache portion has a predefined size.

Clause 10. The method of any one of clauses 8-9, wherein the time window has a predefined duration or has a duration when a predetermined number of incoming queries are submitted for execution.

Clause 11. A computing system comprising: memory; one or more hardware processors coupled to the memory; and one or more computer readable storage media storing instructions that, when loaded into the memory, cause the one or more hardware processors to perform operations comprising: measuring query locality during execution of a plurality of incoming queries in a database management system, wherein the database management system comprises a query execution plan cache which has a size that can store at least some of query execution plans generated for the plurality of incoming queries; and based on the measured query locality, adjusting the size of the query execution plan cache.

Clause 12. The system of clause 11, wherein measuring query locality comprises accumulating promotion distances for the plurality of incoming queries, wherein an increase of accumulated promotion distances indicates a decrease in query locality and a decrease of accumulated promotion distances indicates an increase in query locality.

Clause 13. The system of clause 12, wherein if an incoming query has a generated query execution plan stored in the query execution plan cache, a promotion distance for the incoming query is determined based on a priority order of the generated query execution plan in the query execution plan cache, wherein if the incoming query has no generated query execution plan stored in the query execution plan cache, the promotion distance for the incoming query is set to a count of query execution plans stored in the query execution plan cache.

Clause 14. The system of any one of clauses 11-13, wherein adjusting the size of the query execution plan cache comprises increasing the size of the query execution plan cache if the measured query locality has decreased over a time window, and decreasing the size of the query execution plan cache if the measured query locality has increased over the time window.

Clause 15. The system of clause 14, wherein the time window has a predefined duration or has a duration when a predetermined number of incoming queries are submitted for execution.

Clause 16. The system of any one of clauses 14-15, wherein increasing the size of the query execution plan cache comprises allocating an extra cache to the query execution plan cache, and decreasing the size of the query execution plan cache comprises removing a cache portion from the query execution plan cache.

Clause 17. The system of clause 16, wherein the extra cache allocated to the query execution plan cache and/or the cache portion removed from the query execution plan cache have respective sizes that are predefined or adaptive to the size of the query execution plan cache.

Clause 18. The system of clause 16, wherein the extra cache allocated to the query execution plan cache and/or the cache portion removed from the query execution plan cache have respective sizes that are adaptive to a change of measured query locality over the time window.

Clause 19. The system of any one of clauses 11-18, wherein adjusting the size of the query execution plan cache comprises increasing the size of the query execution plan cache if the measured query locality has decreased over a first threshold over a time window, and decreasing the size of the query execution plan cache if the measured query locality has increased over a second threshold over the time window.

Clause 20. One or more computer-readable media having encoded thereon computer-executable instructions causing one or more processors to perform a method comprising: measuring query locality during execution of a plurality of incoming queries in a database management system, wherein the database management system comprises a query execution plan cache which has a size that can store at least some of query execution plans generated for the plurality of incoming queries; and based on the measured query locality, adjusting the size of the query execution plan cache; wherein measuring query locality comprises accumulating promotion distances for the plurality of incoming queries, wherein an increase of accumulated promotion distances indicates a decrease in query locality and a decrease of accumulated promotion distances indicates an increase in query locality; wherein adjusting the size of the query execution plan cache comprises increasing the size of the query execution plan cache if the measured query locality has decreased over a time window, and decreasing the size of the query execution plan cache if the measured query locality has increased over the time window.

Example 16—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

The invention claimed is:

1. A computer-implemented method comprising:
measuring query locality during execution of a plurality of incoming queries in a database management system, wherein the database management system comprises a query execution plan cache which has a size that can store at least some of query execution plans generated for the plurality of incoming queries, wherein the query execution plans stored in the query execution plan cache have corresponding priority values that are ranked in a priority order list; and
based on the measured query locality, adjusting the size of the query execution plan cache,
wherein measuring query locality comprises determining promotion distances for the plurality of incoming queries,
wherein responsive to a determination that an incoming query has a generated query execution plan stored in the query execution plan cache, a promotion distance for the incoming query is determined as a difference between a first priority value corresponding to the generated query execution plan stored in the query execution plan cache and a second priority value that is ranked highest in the priority order list.

2. The method of claim 1, wherein measuring query locality comprises accumulating promotion distances for the plurality of incoming queries.

3. The method of claim 1, wherein responsive to a determination that an incoming query has no generated query execution plan stored in the query execution plan cache, the promotion distance for the incoming query is set to a count of query execution plans stored in the query execution plan cache.

4. The method of claim 1, wherein adjusting the size of the query execution plan cache comprises increasing the size of the query execution plan cache if the measured query locality has decreased over a time window.

5. The method of claim 4, wherein increasing the size of the query execution plan cache comprises allocating an extra cache to the query execution plan cache, wherein a size of the extra cache is a predefined fraction of a difference between a predefined maximum cache size and the size of the query execution plan cache before allocating the extra cache.

6. The method of claim 4, wherein the time window has a predefined duration or has a duration when a predetermined number of incoming queries are submitted for execution.

7. The method of claim 1, wherein adjusting the size of the query execution plan cache comprises decreasing the size of the query execution plan cache if the measured query locality has increased over a time window.

8. The method of claim 7, wherein decreasing the size of the query execution plan cache comprises removing a cache portion out of the query execution plan cache, wherein the cache portion has a predefined size.

9. The method of claim 7, wherein the time window has a predefined duration or has a duration when a predetermined number of incoming queries are submitted for execution.

10. A computing system comprising:
memory;
one or more hardware processors coupled to the memory; and
one or more computer readable storage media storing instructions that, when loaded into the memory, cause the one or more hardware processors to perform operations comprising:
measuring query locality during execution of a plurality of incoming queries in a database management system, wherein the database management system comprises a query execution plan cache which has a size that can store at least some of query execution plans generated for the plurality of incoming queries, wherein the query execution plans stored in the query execution plan cache have corresponding priority values that are ranked in a priority order list; and
based on the measured query locality, adjusting the size of the query execution plan cache,
wherein measuring query locality comprises determining promotion distances for the plurality of incoming queries,
wherein responsive to a determination that an incoming query has a generated query execution plan stored in the query execution plan cache, a promotion distance for the incoming query is determined as a difference between a first priority value corresponding to the generated query execution plan stored in the query execution plan cache and a second priority value that is ranked highest in the priority order list.

11. The system of claim 10, wherein measuring query locality comprises accumulating promotion distances for the plurality of incoming queries, wherein an increase of accumulated promotion distances indicates a decrease in query locality and a decrease of accumulated promotion distances indicates an increase in query locality.

12. The system of claim 10, wherein responsive to a determination that the incoming query has no generated query execution plan stored in the query execution plan cache, the promotion distance for the incoming query is set to a count of query execution plans stored in the query execution plan cache.

13. The system of claim 10, wherein adjusting the size of the query execution plan cache comprises increasing the size of the query execution plan cache if the measured query locality has decreased over a time window, and decreasing the size of the query execution plan cache if the measured query locality has increased over the time window.

14. The system of claim 13, wherein the time window has a predefined duration or has a duration when a predetermined number of incoming queries are submitted for execution.

15. The system of claim 13, wherein increasing the size of the query execution plan cache comprises allocating an extra cache to the query execution plan cache, and decreasing the size of the query execution plan cache comprises removing a cache portion from the query execution plan cache.

16. The system of claim 15, wherein the extra cache allocated to the query execution plan cache and/or the cache portion removed from the query execution plan cache have respective sizes that are predefined or adaptive to the size of the query execution plan cache.

17. The system of claim 15, wherein the extra cache allocated to the query execution plan cache and/or the cache portion removed from the query execution plan cache have respective sizes that are adaptive to a change of measured query locality over the time window.

18. The system of claim 10, wherein adjusting the size of the query execution plan cache comprises increasing the size of the query execution plan cache if the measured query locality has decreased over a first threshold over a time window, and decreasing the size of the query execution plan cache if the measured query locality has increased over a second threshold over the time window.

19. One or more non-transitory computer-readable media having encoded thereon computer-executable instructions causing one or more processors to perform a method comprising:
measuring query locality during execution of a plurality of incoming queries in a database management system, wherein the database management system comprises a query execution plan cache which has a size that can store at least some of query execution plans generated for the plurality of incoming queries, wherein the query execution plans stored in the query execution plan cache have corresponding priority values that are ranked in a priority order list; and
based on the measured query locality, adjusting the size of the query execution plan cache;
wherein measuring query locality comprises accumulating promotion distances for the plurality of incoming queries, wherein an increase of accumulated promotion distances indicates a decrease in query locality and a decrease of accumulated promotion distances indicates an increase in query locality;
wherein responsive to a determination that an incoming query has a generated query execution plan stored in the query execution plan cache, a promotion distance for the incoming query is determined as a difference between a first priority value corresponding to the generated query execution plan stored in the query execution plan cache and a second priority value that is ranked highest in the priority order list,
wherein adjusting the size of the query execution plan cache comprises increasing the size of the query execution plan cache if the measured query locality has decreased over a time window, and decreasing the size of the query execution plan cache if the measured query locality has increased over the time window.

* * * * *